United States Patent
Kavikkal et al.

(10) Patent No.: US 10,354,132 B2
(45) Date of Patent: Jul. 16, 2019

(54) SYSTEM AND METHOD FOR GENERATING A VIRTUAL ASSISTANT

(71) Applicant: AUTONOM8 INC, Saratoga, CA (US)

(72) Inventors: Balakrishnan Kavikkal, Chennai (IN); Ranjit Padmanabhan, Saratoga, CA (US)

(73) Assignee: Autonom8, Inc., Saratoga, CA (US)

(*) Notice: Subject to any disclaimer, the term of this patent is extended or adjusted under 35 U.S.C. 154(b) by 56 days.

(21) Appl. No.: 15/682,845

(22) Filed: Aug. 22, 2017

(65) Prior Publication Data
US 2019/0065839 A1 Feb. 28, 2019

(51) Int. Cl.
| | | |
|---|---|---|
| G06K 9/00 | (2006.01) | |
| G06Q 10/10 | (2012.01) | |
| G06F 17/24 | (2006.01) | |
| G06F 17/27 | (2006.01) | |
| G06Q 50/00 | (2012.01) | |

(52) U.S. Cl.
CPC ....... G06K 9/00402 (2013.01); G06F 17/243 (2013.01); G06F 17/279 (2013.01); G06K 9/00456 (2013.01); G06K 9/00469 (2013.01); G06Q 10/10 (2013.01); G06Q 50/01 (2013.01)

(58) Field of Classification Search
CPC .. G09B 7/07; G09B 5/00; H04L 29/06; H04L 51/36; G06F 17/30073; G06F 17/30424; G06K 9/00402; G06Q 10/10
See application file for complete search history.

(56) References Cited

U.S. PATENT DOCUMENTS

| | | |
|---|---|---|
| 5,628,003 A | 5/1997 | Fujisawa et al. |
| 5,907,631 A | 5/1999 | Saitoh |
| 7,499,588 B2 | 3/2009 | Jacobs et al. |
| 9,530,069 B2 | 12/2016 | Manmatha et al. |
| 2014/0173692 A1* | 6/2014 | Srinivasan ............ H04W 12/02 726/4 |
| 2016/0012744 A1* | 1/2016 | Rogers ...................... G09B 5/00 434/350 |
| 2016/0063056 A1* | 3/2016 | Schmidt ................. G06Q 10/06 707/603 |
| 2016/0078040 A1* | 3/2016 | Wang ................ G06F 17/30073 707/661 |
| 2017/0242860 A1* | 8/2017 | Souche .................. G06N 5/043 |
| 2017/0270495 A1* | 9/2017 | Hardin ............... G06Q 30/0273 |
| 2018/0006820 A1* | 1/2018 | Arasu ................... H04L 9/3234 |
| 2018/0131765 A1* | 5/2018 | Puleston ........... G06F 17/30997 |
| 2018/0217836 A1* | 8/2018 | Johnson .................... G06F 9/28 |
| 2018/0285430 A1* | 10/2018 | Mehta ............... G06F 17/30554 |

* cited by examiner

*Primary Examiner* — Amir Alavi

(57) ABSTRACT

A system and method for generating a virtual assistant is disclosed. The system for generating a virtual assistant includes a configuration subsystem configured to receive one or more parameters from a document. The configuration subsystem is also configured to serialize the one or more parameters automatically extracted from the document and generate a structured object based on the one or more serialized parameters. The configuration unit is further configured to embed all validation criteria specified in the document. The system for generating a virtual assistant also includes a virtual assistant generator operatively coupled with the configuration subsystem and configured to analyze the structured object. The virtual assistant generator is also configured to automatically generate a virtual assistant based on an analyzed structured object.

8 Claims, 3 Drawing Sheets

SYSTEM AND METHOD FOR GENERATING A VIRTUAL ASSISTANT

BACKGROUND

Embodiments of the present disclosure relate to digital data processing, and more particularly to, a system and method for generating a virtual assistant.

Conventional systems utilize manual methods of data entry to fill a form or for other personalized services. However, such methods are time consuming and result in low accuracy and low completion rates. With advancements in technology, a virtual assistant can be used to fill a form or perform other personalized services. The virtual assistant is a computer program which is designed to simulate intelligent conversation between one or more users via audio, textual, image, video, touch, gesture and other such modes of interaction. The virtual assistant is integrated into a conversational system for various purposes such as personalized services or information acquisition.

Furthermore, some conversational systems include a plurality of virtual assistants, each for a predefined category. Such systems analyse one or more input documents to categorize such one or more input documents under one or more predefined categories. Furthermore, a corresponding virtual assistant is determined based on the one or more predefined category and integrated in to the conversational system to fill the one or more input documents based on the one or more category.

Hence, there is a need for an improved, system and method for automated generation of conversational virtual assistants to address the aforementioned issues.

BRIEF DESCRIPTION

In accordance with one embodiment of the disclosure, a system and method for generating a virtual assistant is provided. The system for generating a virtual assistant includes a configuration subsystem configured to receive one or more parameters from a document. The configuration subsystem is also configured to serialize the one or more parameters automatically extracted from the document. The configuration subsystem is further configured to generate a structured object based on the one or more serialized parameters. The configuration unit is further configured to embed a plurality of validation criteria specified in the document. The system for generating a virtual assistant also includes a virtual assistant generator operatively coupled with the configuration subsystem and configured to analyse the structured object. The virtual assistant generator is also configured to automatically generate a virtual assistant based on an analysed structured object.

In accordance with another embodiment of the present disclosure, a method for generating a virtual assistant is provided. The method for generating a virtual assistant includes receiving a document. The method for generating a virtual assistant also includes automatically extracting one or more parameters from the document. The method for generating a virtual assistant further includes serializing the one or more parameters extracted from the document. The method for generating a virtual assistant further includes generating a structured object based on one or more serialized parameters. The method for generating a virtual assistant further includes embedding a plurality of validation criteria specified in the document. The method for generating a virtual assistant further includes analysing the structured object. The method for generating a virtual assistant further includes automatically generating a virtual assistant based on an analysed structured object.

To further clarify the advantages and features of the present invention, a more particular description of the invention will follow by reference to specific embodiments thereof, which are illustrated in the appended figures. It is to be appreciated that these figures depict only typical embodiments of the invention and are therefore not to be considered limiting in scope. The invention will be described and explained with additional specificity and detail with the appended figures.

BRIEF DESCRIPTION OF THE DRAWINGS

The disclosure will be described and explained with additional specificity and detail with the accompanying figures in which.

Figure 1:
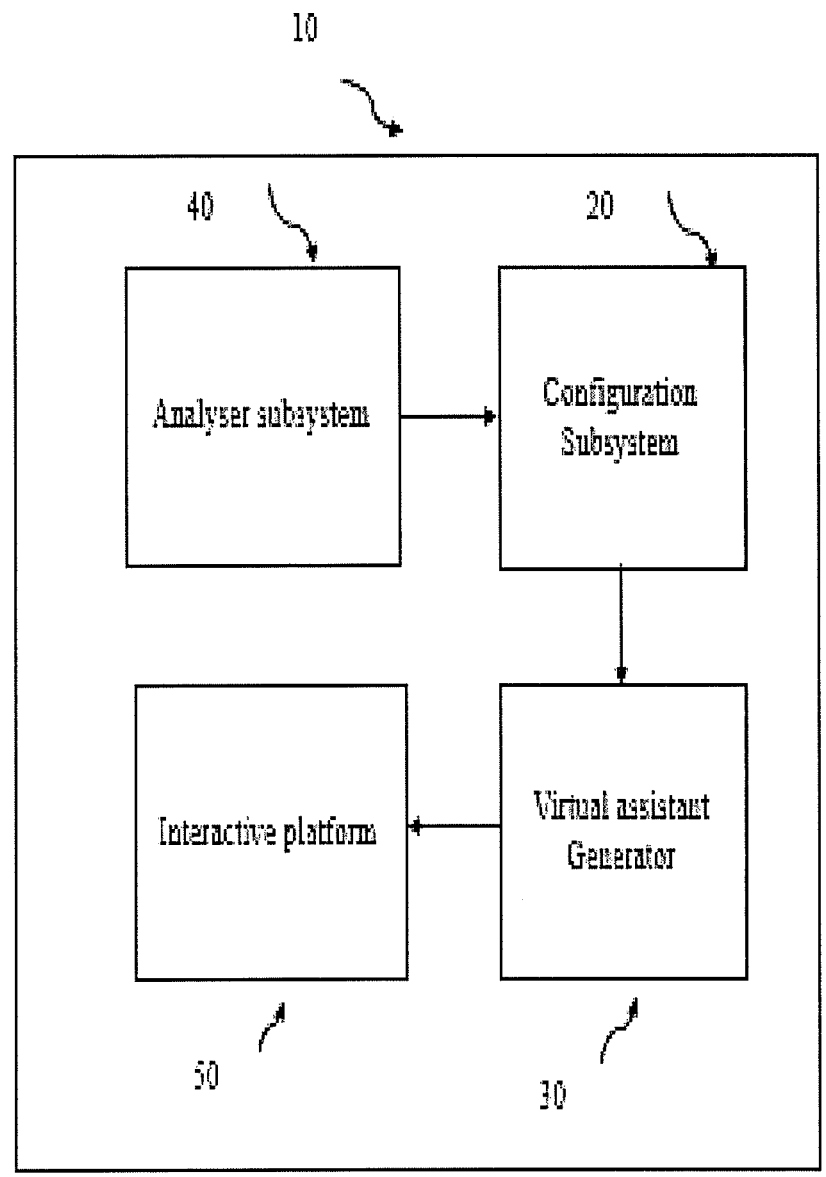
FIG. 1 illustrates a block diagram of a system for generating a virtual assistant in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those skilled in the art having the benefit of the description herein.

DETAILED DESCRIPTION

For the purpose of promoting an understanding of the principles of the invention, reference will now be made to the embodiment illustrated in the figures and specific language will be used to describe them. It will nevertheless be understood that no limitation of the scope of the invention is thereby intended. Such alterations and further modifications in the illustrated system, and such further applications of the principles of the invention as would normally occur to those skilled in the art are to be construed as being within the scope of the present invention.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this invention belongs. The system, methods, and examples provided herein are only illustrative and not intended to be limiting.

Embodiments of the present disclosure will be described below in detail with reference to the accompanying figures.

Embodiment of the present disclosure relate to a system and method for generating a virtual assistant. The system for generating a virtual assistant includes a configuration subsystem configured to receive one or more parameters from a document. The configuration subsystem is also configured to serialize the one or more parameters automatically extracted from the document. The configuration subsystem is further configured to generate a structured object based on the one or more serialized parameters. The configuration unit further is configured to embed a plurality of validation criteria specified in the document. The system for generating a virtual assistant also includes a virtual assistant generator operatively coupled with the configuration subsystem and configured to analyse the structured object. The virtual assistant generator is also configured to automatically generate a virtual assistant based on an analysed structured object.

In the following specification and the claims, reference will be made to a number of terms, which shall be defined to have the following meanings. The singular forms "a", "an", and "the" include plural references unless the context clearly dictates otherwise.

FIG. 1 illustrates a block diagram of a system for generating a virtual assistant in accordance with an embodiment of the present disclosure. The system 10 for generating a virtual assistant includes a configuration subsystem 20 and a virtual assistant generator 30 coupled with the configuration subsystem 20.

The system 10 for generating a virtual assistant includes a configuration subsystem 20 configured to receive one or more parameters from a document. In one embodiment, the document may include a registration form, a questionnaires form, a survey form or a job applications form. In another embodiment, the document may include the document in an online mode, the document in a standalone mode, the document in a mobile application mode.

In one embodiment, the system 10 for generating a virtual assistant also include an analyser subsystem 40 configured to extract one or more parameters automatically from the document. In another embodiment, the analyser subsystem 40 may also configured to automatically extract one or more fields of the document, one or more values from the one or more fields of the document, a flow of the one or more fields in the document, and a plurality of additional rules.

The configuration subsystem 20 may also be configured to serialize the one or more parameters automatically extracted from the document. The configuration subsystem 20 may further configured to generate a structured object based on the one or more serialized parameters. The configuration subsystem 20 may be further configured to embed a plurality of validation criteria specified in the document.

The system 10 for generating a virtual assistant includes a virtual assistant generator 30 configured to analyse the structured object. The virtual assistant generator 30 is also configured to automatically generate a virtual assistant based on an analysed structured object.

In one embodiment, the system 10 for generating a virtual assistant further includes an interactive platform 50 configured to integrate the virtual assistant for bidirectional interaction between one or more users. In another embodiment, the one or more users includes an electronic device. In a specific embodiment, the electronic device may include an internet of things device or another virtual assistant.

In one embodiment, the interactive platform 50 may include one or more user interface modules. In another embodiment, the one or more user interface modules may include a plurality of buttons and a plurality of selectors. In yet another embodiment, the interactive platform 50 may include an internet based interactive platform, a mobile based interactive platform or a television based interactive platform.

Figure 2:
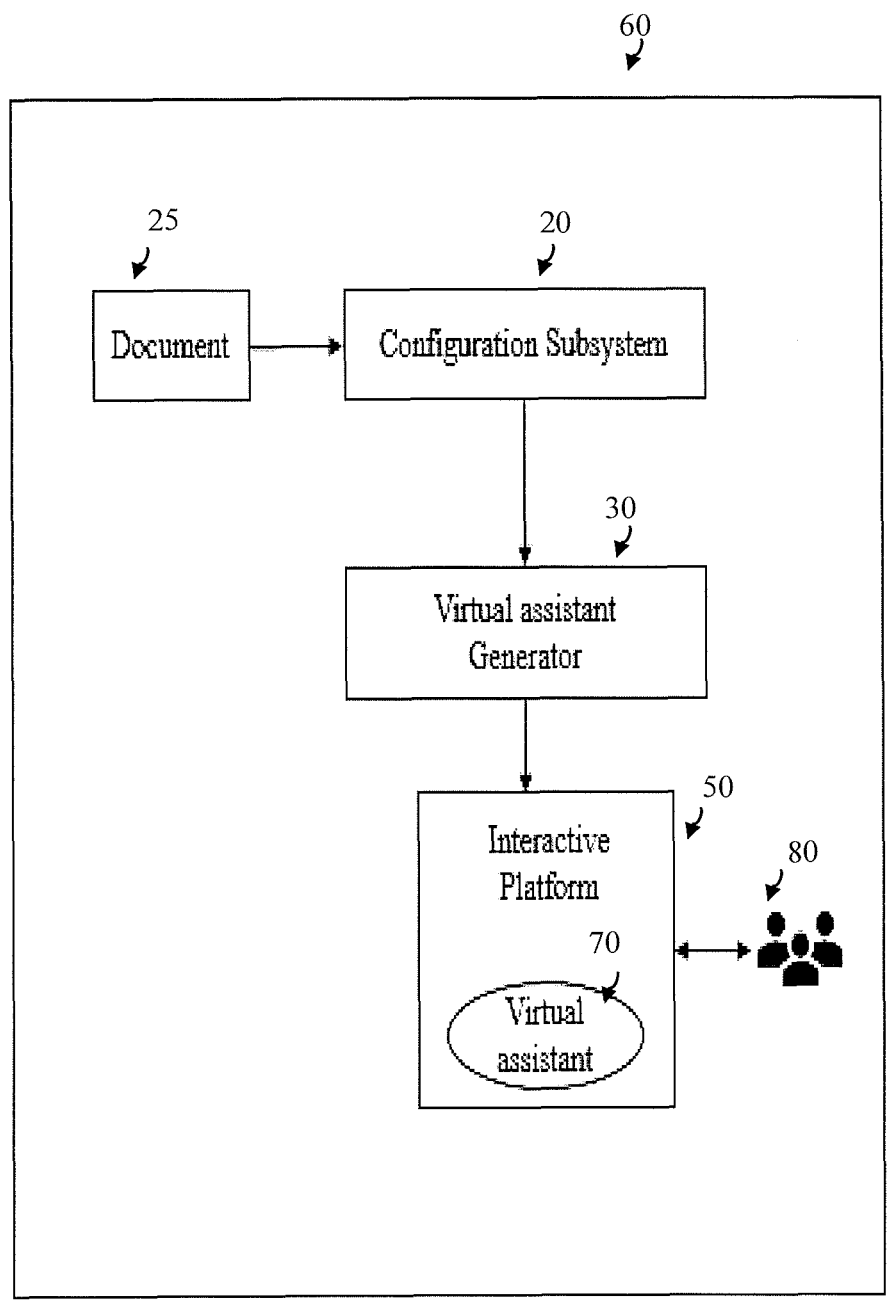
FIG. 2 is a schematic representation of an exemplary system for generating a virtual assistant in accordance with an embodiment of the present disclosure.

FIG. 2 is a schematic representation of an exemplary system for generating a virtual assistant in accordance with an embodiment of the present disclosure. The system includes an interactive platform configured to integrate the virtual assistant for bidirectional interaction between one or more users. The interactive platform may include an internet based interactive platform, a mobile based interactive platform or a television based interactive platform.

Figure 3:
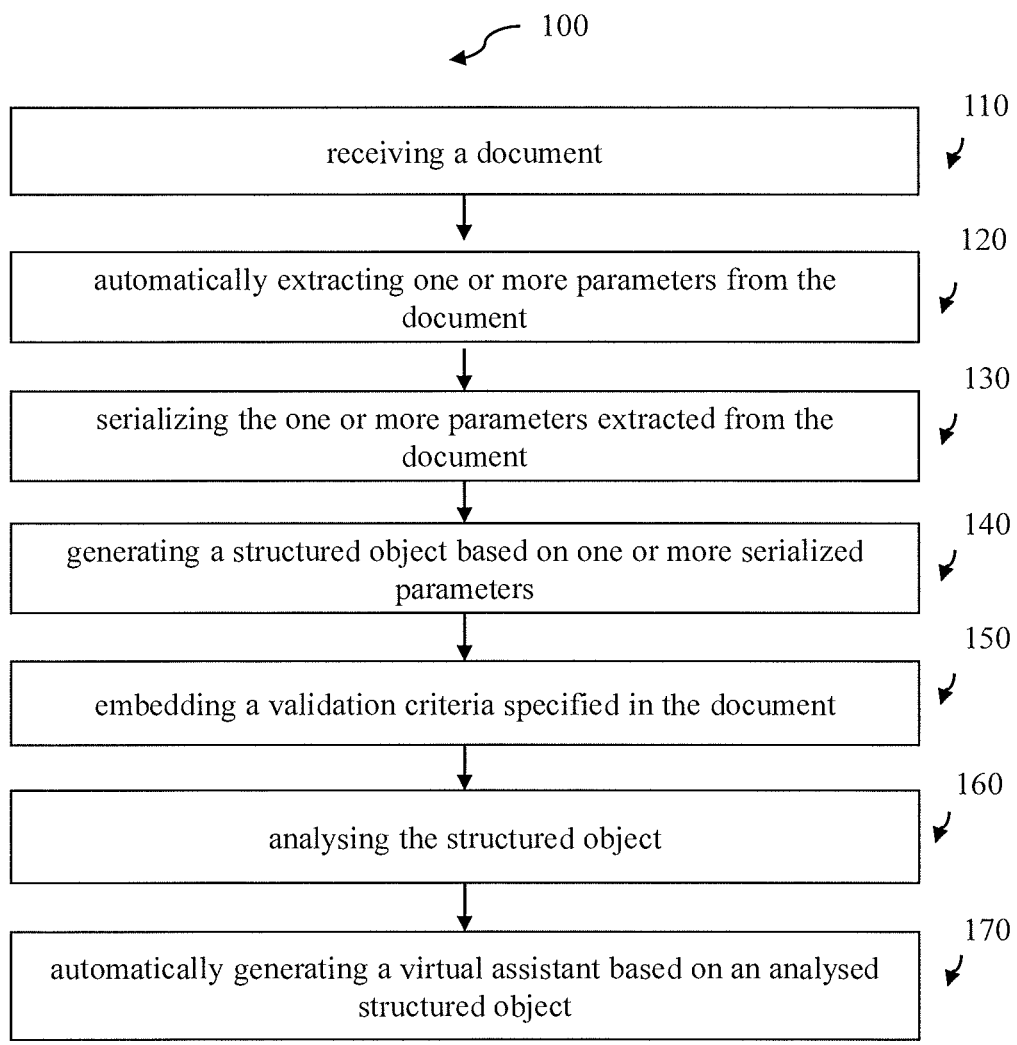
FIG. 3 illustrates a process flow diagram of a system for generating a virtual assistant in accordance with an embodiment of the present disclosure.

FIG. 3 illustrates a process flow diagram of a system for generating a virtual assistant in accordance with an embodiment of the present disclosure. The method 100 for generating a virtual assistant includes receiving a document in step 110. The method 100 for generating a virtual assistant also includes automatically extracting one or more parameters from the document in step 120. In one embodiment, automatically extracting the one or more parameters from the document may include automatically extracting one or more fields of the document, one or more values from the one or more fields of the document, a plurality of possible flows of the one or more fields in the document, and a plurality of additional rules.

In a specific embodiment, automatically extracting the one or more fields may include automatically extracting one or more names and one or more labels. In another specific embodiment, automatically extracting the one or more values may include automatically extracting one or more data types and a plurality of code modules. In yet another specific embodiment, automatically extracting the flow of the one or more fields includes extracting a branching flow, a looping flow or a sequential flow.

The method 100 for generating a virtual assistant further includes serializing the one or more parameters extracted from the document in step 130. In one embodiment, manually curating the one or more parameters from the document. The method 100 for generating a virtual assistant further includes generating a structured object based on one or more serialized parameters in step 140.

The method 100 for generating a virtual assistant further includes embedding a plurality of validation criteria specified in the document in step 150. The method 100 for generating a virtual assistant further includes analysing the structured object in step 160. The method 100 for generating a virtual assistant further includes automatically generating a virtual assistant based on an analysed structured object in step 170.

In one embodiment, the method 100 also includes installing the virtual assistant in an interactive platform for bidirectional interaction with one or more users. In another embodiment, method 100 includes filling the one or more fields of the documents using the virtual assistant.

In one embodiment, the generated virtual assistant may be configured to converse in natural languages with the one or more users. In another embodiment, the virtual assistant may recall prior conversations with the one or more users. In yet another embodiment, the virtual assistant may be configured to verify the one or more parameters with the user extracted from the document. The one or more parameters may include one or more fields of the document or one or more values from the one or more fields of the document.

In one embodiment, the virtual assistant may be configured to validate the format of the one or more parameters. For example, a name must not contain digits and an email address should have a proper structure. In another embodiment, the virtual assistant may respond to text, images, video and other commands such as notifications or Application Program Interface (API) calls. In yet another embodiment, the virtual assistant may retrieve one or more parameters from an external service to pre-fill or enrich the document. In a specific embodiment, the external service may include online websites or social media websites.

The various embodiments of the present disclosure enable the virtual assistant to fill the document automatically by extracting the one or more parameters from the document. Furthermore, the system for generating a virtual assistant is advantageous as the system does not work on predefined categories. Instead, the system extracts the one or more parameters from the document and generates a virtual assistant which include all the categories to fill the document. The system saves time and has better accuracy and completion rates.

While specific language has been used to describe the invention, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

What we claim is:

1. A method for generating a virtual assistant comprising:
   receiving a document;
   automatically extracting one or more parameters from the document;
   serializing the one or more parameters extracted from the document;
   generating a structured object based on one or more serialized parameters;
   embedding a plurality of validation criteria specified in the document;
   analysing the structured object; and
   automatically generating a virtual assistant based on an analysed structured object.

2. The method as claimed in claim 1, wherein automatically extracting the one or more parameters from the document comprises automatically extracting one or more fields of the document, one or more values from the one or more fields of the document, a plurality of possible flows of the one or more fields in the document, and a plurality of additional rules.

3. The method as claimed in claim 2, wherein automatically extracting the one or more fields comprises automatically extracting one or more names and one or more labels.

4. The method as claimed in claim 2, wherein automatically extracting the one or more values comprises automatically extracting one or more data types and a plurality of code modules.

5. The method as claimed in claim 2, wherein automatically extracting the flow of the one or more fields comprises extracting a branching flow, a looping flow or a sequential flow.

6. The method as claimed in claim 1, further comprising manually curating the one or more parameters from the document.

7. The method as claimed in claim 1, further comprising installing the virtual assistant in an interactive platform for bidirectional interaction with one or more users.

8. The method as claimed in claim 1, further comprising filling the one or more fields of the documents using the virtual assistant.

* * * * *